United States Patent [19]

May

[11] Patent Number: 5,827,919

[45] Date of Patent: Oct. 27, 1998

[54] FLUOROURETHANE ADDITIVES FOR WATER-DISPERSED COATING COMPOSITIONS

[75] Inventor: Donald Douglas May, Chadds Ford, Pa.

[73] Assignee: E. I. du Pont de Nemours and Company, Wilmington, Del.

[21] Appl. No.: 695,105

[22] Filed: Aug. 7, 1996

Related U.S. Application Data

[60] Provisional application No. 60/004,912, Oct. 6, 1995.

[51] Int. Cl.$^6$ ................. C08J 3/00; C08K 3/20; C08L 75/00; B05D 3/02

[52] U.S. Cl. ............ 524/590; 427/385.5; 427/393; 524/507; 524/591; 524/839; 524/840; 528/44; 528/63; 528/70

[58] Field of Search ................ 524/507, 590, 524/591, 839, 840; 528/44, 63, 70; 427/385.5, 393

[56] References Cited

U.S. PATENT DOCUMENTS

| | | | |
|---|---|---|---|
| 5,039,739 | 8/1991 | Padget et al. | 524/839 |
| 5,350,795 | 9/1994 | Smith et al. | 524/507 |
| 5,410,073 | 4/1995 | Kirchner | 560/357 |
| 5,411,766 | 5/1995 | Kirchner | 427/393 |
| 5,414,111 | 5/1995 | Kirchner | 560/357 |

OTHER PUBLICATIONS

Gauntt, D.L. et al., A Soil Resistant Treatment for Low Gloss Coatings, *J. Coatings Technology*, 63, No. 803, 25–32, Dec. 1991.

*Primary Examiner*—Patrick D. Niland

[57] ABSTRACT

Fluorourethane additives for water-dispersed coating compositions comprising the product of the reaction of 1) at least one diisocyanate, or polyisocyanate or a mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of the formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_1$–$C_{18}$ omega-alkenyl radical, or $C_1$–$C_{18}$ omega-alkenoyl; $R_2$ is —$C_nH_{2n}$— optionally end-capped with —$[OCH_2C(R_4)H]_p$—, —$[OCH_2C(CH_2Cl)H]_p$—, or —$C(R_5)(R_6)(OCH_2C[CH_2Cl]H)_p$—, wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the diisocyanate or polyisocyanate are disclosed.

9 Claims, No Drawings

FLUOROURETHANE ADDITIVES FOR WATER-DISPERSED COATING COMPOSITIONS

CROSS REFERENCE TO RELATED APPLICATION

This application claims the benefit of U.S. Provisional Application No. 60/004,912, filed Oct. 6, 1995.

FIELD OF THE INVENTION

This invention relates to substituted perfluoroalkyl diisocyanates or diisocyanates which are extended by partial reaction with water. Such compounds are used as additives for water-dispersed coating compositions to reduce swelling of wood substrates and to provide soil resistance, oil repellency, and improved cleanability to the dried coating. This invention further relates to the coating compositions containing such additives, and the dried coatings formed from such coating compositions.

BACKGROUND OF THE INVENTION

Water-dispersed coating compositions provide major advantages over solvent-based paints, such as in non-flammability, solvent cost, and environmental concerns over the evaporation of volatile organic compounds during manufacture and application.

Conventional air-dry water-dispersed coating compositions utilize, as the binder or film-forming component, an emulsion, latex, or suspension of a resin, wax, or other film-forming material. For example, in conventional paints, a resin is used. Such resins are commonly formed from acrylic ester copolymers (acrylic emulsion or latex paints) or from vinyl acetate, vinyl chloride, or vinyl butyral polymers or copolymers (vinyl emulsion or latex paints), although other emulsified or suspended film-forming materials may be used. Such diverse formulations are well known to those skilled in the art. Emulsion paints are described by W. M. Morgans in "Outlines of Paint Technology". 3rd. Ed., Halstead Press (John Wiley & Sons, Inc., New York N.Y., 1990). During application, the water evaporates, leaving a matrix of pigment and polymer particles interspersed with the minor components. The coating is formed as particles coalesce to a continuous film incorporating the pigment.

While such dried water-dispersed coating compositions have good protective and decorative properties and can give reasonable water repellency, they have little or no oil repellency. This lack of oil repellency can lead to the problem of soiling. In particular, such dried coatings show poor oil-repellency in contact angle measurements, cleaning of soil, and they have poor soiling resistance. Additionally, water-dispersed coatings tend to cause swelling of wood substrates, potentially detracting from the quality of the dried finish.

Kirchner, in U.S. Pat. No. 5,414,111, discloses polyfluoro nitrogen-containing compounds formed, for instance, by reacting an isocyanate trimer with fluorinated alcohols and then further extending the reaction product with water. Such products were applied to fibrous substrates to impart water-, oil-, and soil repellency and/or soil release properties to such substrates. There is no disclosure of the use of these compounds as additives to water-dispersed coating compositions to improve soil resistance and improved cleanability.

Elsewhere fluorinated surfactants are taught as rheology modifiers in paint films, but not as additives to improve soil resistance and cleanability for water-dispersed coating compositions. Recently, it has been found that the cleanability of flat urethane finishes can be improved by applying to the dry surface a coating of LUDOX (a brand of colloidal silica available from E. I. du Pont de Nemours and Company, Wilmington Del.). This approach has two deficiencies, 1) it requires the surface to be painted twice and 2) it is removed with the soil. It is preferred that the cleanability enhancement agent can be applied along with the paint and that it retains its effect after washing.

It is highly desirable to be able to provide cost effective, durable soil resistance and cleanability to dried water-dispersed coating compositions by the addition of an aqueous emulsion of such oil-repellent additives to conventional water-dispersed coating compositions.

SUMMARY OF THE INVENTION

The present invention comprises a polyfluorourethane compound which is the product of the reaction of: (1) at least one diisocyanate, (2) at least one fluorochemical compound containing at least one Zerewitinoff hydrogen in an amount sufficient to react with 5% to 80% of the isocyanate groups in the diisocyanate, (3) at least one compound of formula $R_{10}$—$(R_2)_k$—YH in an amount sufficient to react with 5% to 80% of the isocyanate groups in the diisocyanate wherein $R_{10}$ is a $C_1$-$C_{18}$ alkyl, $C_1$-$C_{18}$ omega-alkenyl radical, or $C_1$-$C_{18}$ omega-alkenoyl; $R_2$ is —$C_nH_{2n}$— optionally end-capped by —[$OCH_2C(R_4)H]_p$—, —[$OCH_2C(CH_2Cl)H]_p$—, or —$C(R_5)(R_6)(OCH_2C[CH_2Cl]H)_p$— wherein $R_4$, $R_5$, and $R_6$ are the same or different and are H or a $C_1$-$C_6$ alkyl radical, n is 0 to 12, and p is 1 to 50; Y is O, S, or $N(R_7)$ wherein $R_7$ is H or $C_1$-$C_6$ alkyl; and k is 0 or 1; and optionally (4) water in an amount sufficient to react with 5% to 60% of the isocyanate groups in the diisocyanate.

The present invention further comprises a polyfluorourethane compound which is the product of the reaction of: (1) at least one polyisocyanate or a mixture of polyisocyanates containing at least three isocyanate groups per molecule, (2) at least one fluorochemical compound containing at least one Zerewitinoff hydrogen in an amount sufficient to react with 5% to 33% of the isocyanate groups in the polyisocyanate, (3) at least one compound of the formula $R_{10}$—$(R_2)_k$—YH in an amount sufficient to react with 5% to 80% of the isocyanate groups in the polyisocyanate and wherein $R_{10}$ is a $C_1$-$C_{18}$ alkyl, $C_1$-$C_{18}$ omega-alkenyl radical, or $C_1$-$C_{18}$ omega-alkenoyl; $R_2$ is —$C_nH_2n$— optionally end-capped by —[$OCH_2C(R_4)H]_p$—, —[$OCH_2C(CH_2Cl)H]_p$—, or —$C(R_5)(R_6)(OCH_2C[CH_2Cl]H)_p$—, wherein $R_4$, $R_5$, and $R_6$ are the same or different and are H or a $C_1$-$C_6$ alkyl radical, n is 0 to 12, p is 1 to 50; Y is O, S, or $N(R_7)$ wherein $R_7$ is H or $C_1$-$C_6$ alkyl; and k is 0 or 1; and optionally (4) water in an amount sufficient to react with 5% to 60% of the isocyanate groups in the polyisocyanate.

The present invention further comprises an improved water-dispersed coating composition, and the dried coatings derived therefrom, comprising an emulsion, latex, or suspension of a film-forming material dispersed in an aqueous medium wherein the improvement comprises the incorporation into the aqueous medium of a polyfluorourethane compound which is the product of the reaction of:(1) at least one diisocyanate, or polyisocyanate or mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_1$–$C_{18}$ omega-alkenyl radical, or $C_1$–$C_{18}$ omega-alkenoyl; $R_2$ is —$C_nH_2n$— optionally end-capped by —[$OCH_2C(R_4)H]_p$—, —[$OCH_2C(CH_2Cl)H]_p$—, or —$C(R_5)$ ($R_6$) ($OCH_2C[CH_2Cl]H)_p$— wherein $R_4$, $R_5$, and $R_6$ are the same or different and are H or a $C_1$–$C_6$ alkyl radical, n is 0 to 12, p is 1 to 50; Y is O, S, or N($R_7$) wherein $R_7$ is H or $C_1$–$C_6$ alkyl; and k is 0 or 1; and optionally (4) water in an amount sufficient to react with 5% to 60% of the isocyanate groups in the diisocyanate or polyisocyanate.

The present invention further comprises both a method for reducing the swelling of a wood substrate when coated with the improved water-dispersed coating composition and a method for improving the cleanability and oil repellency of a surface having deposited thereon a dry coating composition comprising the improved water-dispersed coating composition described above.

DETAILED DESCRIPTION OF THE INVENTION

The present invention comprises polyfluorourethane compounds, water dispersed coating compositions containing polyfluorourethane compounds and the dried coatings derived from such compositions. Such compounds are formulated as aqueous emulsions and added to conventional water-dispersed coating compounds, such as paints and finishes, used on various substrates. For wood substrates the compounds reduce swelling of the wood when coated with a water-dispersed coating composition. Dried coatings from such modified water-dispersed coating compositions provide soil resistance, oil repellency, and improved cleanability to substrate surfaces.

The polyfluorourethane compounds (hereinafter "polyfluorourethane additives" or "polyurethane compounds") of the present invention are categorized based upon the use of diisocyanate or polyisocyanate (hereinafter the isocyanate reactant) as a reactant in their preparation as follows:

1) compounds prepared by reacting one or more diisocyanates (the isocyanate reactant), a fluorochemical compound containing one or more Zerewitinoff hydrogens (hereinafter the fluorochemical reactant) in an amount sufficient to react with 5% to 80% of the isocyanate groups, a compound of formula ($R_{10}$)—($R_2$)$_k$—YH (hereinafter the non-fluorinated reactant), and optionally water; and 2) compounds prepared by reacting one or more polyisocyanates (the isocyanate reactant), a fluorochemical compound containing one or more Zerewitinoff hydrogens (fluorochemical reactant) in an amount sufficient to react with 5% to 33% of the isocyanate groups, a non-fluorinated reactant of formula ($R_{10}$)—($R_2$)$_k$—YH, and optionally water.

The polyfluorourethane additives used in the improved coating compositions and dried coating compositions of the present invention comprise both categories of the above polyfluorourethane compounds plus an additional group of compounds. This additional group comprises compounds prepared by reacting a polyisocyanate (the isocyanate reactant), a fluorochemical reactant in an amount sufficient to react with 5% to 80% of the isocyanate groups, a non-fluorinated reactant of formula ($R_{10}$—($R_2$)$_k$—YH, and optionally water.

By the term "water-dispersed coating compositions" as used herein is meant surface coatings intended for the decoration or protection of a substrate, comprising essentially an emulsion, latex, or suspension of a film-forming material dispersed in an aqueous phase, and optionally containing surfactants, protective colloids and thickeners, pigments and extender pigments, preservatives, fungicides, freeze-thaw stabilizers, antifoam agents, agents to control pH, coalescing aids, and other ingredients. Water-dispersed coating compositions are exemplified by, but not limited to, pigmented coatings such as latex paints, unpigmented coatings such as wood sealers, stains, and finishes, coating compositions for masonry and cement, and water-based asphalt emulsions. For latex paints the film forming material is a latex polymer of acrylate acrylic, vinyl-acrylic, vinyl, or a mixture thereof. Such water-dispersed coating compositions are described by C. R. Martens in "Emulsion and Water-Soluble Paints and Coatings" (Reinhold Publishing Corporation, New York N.Y., 1965).

Conventional air-dry water-dispersed coating compositions utilize, as the binder or film-forming component, an emulsion comprising polymers of methyl methacrylate, butyl acrylate, and methacrylic acid in an aqueous solvent (available as RHOPLEX from Rohm & Haas Company, Philadelphia Pa.), vinyl acrylic, methacrylic, butyl acrylate, and methacrylic acid (available as ROVACE 9100 from Rohm & Haas Company) or UCAR (available from Union Carbide, Danbury Conn.).

The optional partial reaction of diisocyanates or polyisocyanates with water is referred to as "extension of the diisocyanate" and the reaction product is referred to as an "extended diisocyanate". Procedures for extending diisocyanates are well known in the art. As an example, Wagner in U.S. Pat. No. 3,124,605 describes methods for extending 1-methyl benzene-2,4-diisocyanate by reacting it with one half molar proportion of water to yield tri-N,N',N"-(3-isocyanato-4-methylphenyl)biuret.

A "Zerewitinoff hydrogen" is an active hydrogen which will react with a methyl magnesium halide (Grignard reagent) to liberate methane. The reaction is quantifiable by the method of Zerewitinoff et al., wherein an organic compound containing an active hydrogen such as —OH, —COOH, and the like is reacted with a methylmagnesium halide to liberate methane. Volumetric measurement of the methane permits a quantitative estimate of the active hydrogen content of the compound. Primary amines give 1 mol of methane when reacted in the cold, usually 2 mol when heated (Organic Chemistry by Paul Karrer, English translation published by Elsevier, 1938, p. 135). For purposes of this invention, it is assumed that a primary amine provides one active hydrogen as defined by Zerewitinoff et al. A Zerewitinoff hydrogen reacts with isocyanate groups to form urethanes.

The dried water-dispersed coating composition of the present invention comprises a coating composition containing at least one polyfluorourethane additive as defined above that has been allowed to dry for 7 days under normal room conditions of about 70° F. (21° C.) and about 50% relative humidity.

The polyfluorourethane additives of this invention are prepared from (1) an isocyanate reactant, (2) a fluorochemical reactant, (3) a non-fluorinated reactant, and optionally (4) water. The polyfluorourethane additives are prepared in a suitable solvent, converted to an aqueous emulsion, and mixed into a water-dispersed coating composition in an amount sufficient to yield a dried coating containing from about 100 to about 20,000 μg/g fluorine. The dried coatings have increased soil resistance, increased oil repellency, and improved cleanability. The reactants and catalyst used to make the polyurethane compounds, the preparation and emulsification processes, and the use and application of the polyurethane additives in water-dispersed coating compositions are described sequentially below.

Any diisocyanate or polyisocyanate having three or more isocyanate groups can be used as the first or isocyanate reactant for the purposes of this invention. For example, one can use hexamethylene diisocyanate homopolymers having the formula:

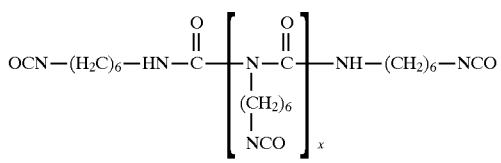

wherein x is an integer equal to or greater than 1, preferably between 1 and 8. Because of their commercial availability, mixtures of such hexamethylene diisocyanate homopolymers are preferred for purposes of this invention. Also of interest are hydrocarbon diisocyanate-derived isocyanurate trimers which can be represented by the formula:

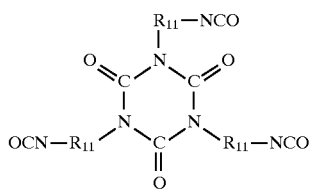

wherein $R_{11}$ is a divalent hydrocarbon group, preferably aliphatic, alicyclic, aromatic, or arylaliphatic. For example, $R_1$ is hexamethylene, toluene, or cyclohexylene, preferably the former. Other polyisocyanates useful for the purposes of this invention are those obtained by reacting three mol of toluene diisocyanate with 1,1,1-tris-(hydroxymethyl)ethane or 1,1,1-tris-(hydroxymethyl)propane. The isocyanurate trimer of toluene diisocyanate and that of 3-isocyanatomethyl-3,4,4-trimethylcyclohexyl isocyanate are other examples of polyisocyanates useful for the purposes of this invention, as is methine-tris-(phenylisocyanate). Also useful for the purposes of this invention is the polyisocyanate having the formula:

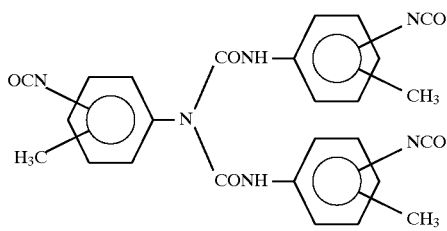

Suitable commercially available diisocyanates are exemplified by DESMODUR H (1,6-hexamethylene diisocyanate, HMDI), DESMODUR W (bis[4-isocyanatocyclohexyl]methane, PICM), MONDUR TD (a mixture of toluene diisocyanate isomers, specifically 2,4-diisocyanato-1-methylbenzene and 1,3-diisocyanato-2-methylbenzene, TDI), MONDUR M (4,4'-diisocyanatodiphenylmethane, MDI), and isophorone diisocyanate (5-isocyanato-1-(isocyanatomethyl)-1,3,3-trimethyl-cyclohexane, IPDI) each available from Aldrich Chemical Co., Milwaukee Wis.

Suitable preformed commercially available extended diisocyanates are exemplified by DESMODUR 3200 and DESMODUR N-100 (hexamethylene diisocyanate homopolymers) available from Bayer Corporation, Pittsburgh Pa., both presumably prepared by the process described in U.S. Pat. No. 3,124,605 to give mixtures of the mono-, bis-, tris-, tetra-, and higher order derivatives. Also suitable is DESMODUR 3300 (a hexamethylene derived isocyanurate trimer), and CYTHANE 3160 (a glycerol based isocyanate) available from American Cyanamid, Stamford Conn.

Typical properties of such compounds are as follows:

| Typical Properties | Ave. Eq. Wt. | NCO Content. % |
|---|---|---|
| DESMODUR N-100 | 191 | 22.0 |
| DESMODUR N-3200 | 181 | 23.2 |

The typical NCO content of Desmodur N-100 approximates that listed for a SRI International Report (Isocyanates No. 1D, July, 1983, Page 279) hexamethylene diisocyanate homopolymer with the following composition:

| Product Composition | Wt. % |
|---|---|
| Hexamethylene diisocyanate | 0.1 |
| Monobiuret | 44.5 |
| Bisbiuret | 17.4 |
| Trisbiuret | 9.5 |
| Tetrabiuret | 5.4 |
| Higher Mol. Wt. Derivatives | 23.1 |
| NCO Content | 21.8 |

Based on its average equivalent weight and NCO content, the comparative bis, tris, tetra, etc., content of DESMODUR N-3200 should be less than that of the N-100 product. DESMODUR N-3300 is a hexamethylene diisocyanate-derived isocyanurate trimer of formula

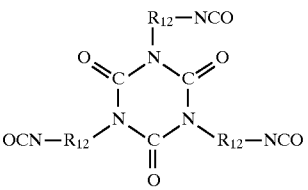

wherein $R_{12}$ is hexamethylene.

A wide variety of fluorochemical compounds can be used as the second or fluorochemical reactant so long as each fluorochemical compound contains at least two carbon atoms and each carbon atom contains at least two fluorine atoms. For example, the fluorochemical compound can be represented by the formula:

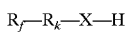

wherein $R_f$ is a monovalent aliphatic group containing at least two carbon atoms each of which contains at least two fluorine atoms;

R is a divalent organic radical;

k is 0 or 1; and

X is —O—, —S—, or —N($R_1$)— in which $R_1$ is H, an alkyl group containing 1 to 6 carbon atoms or a $R_f$—$R_k$-group.

In a more specific embodiment, the fluorochemical compound which contains a single functional group can be represented by the formula:

$$R_f-R_k-R_2-X-H$$

wherein

R$_f$ and k are as defined above;

R is a divalent radical: $-C_mH_{2m}SO-$, $-C_mH_{2m}SO_2-$, $-SO_2N(R_3)-$, or $-CON(R_3)$ in which m is 1 to 22 and R$_3$ is H or a divalent alkyl group of 1 to 6 carbon atoms;

R$_2$ is a divalent linear hydrocarbon radical, $-C_nH_{2n}-$, which is optionally end-capped with

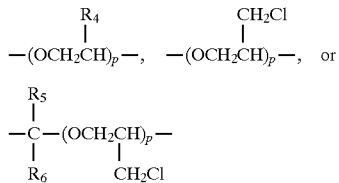

in which n is 0 to 12, p is 1 to 50;

R$_4$, R$_5$ and R$_6$ are the same or different and are H or an alkyl group containing 1 to 6 carbon atoms;

X is O, S, or N(R$_7$) in which R$_7$ is H, an alkyl group containing 1 to 6 carbon atoms, or a R$_f$—R$_k$—R$_2$-group.

More particularly, R$_f$ is a fully-fluorinated straight or branched aliphatic radical of 3 to 20 carbon atoms which can be interrupted by oxygen atoms.

In a preferred embodiment, the fluorochemical compound can be represented by the formula:

$$R_f-(CH_2)_q-X-H$$

wherein

X is O, S, or N(R$_7$) in which R$_7$ is H, an alkyl group containing 1 to 6 carbon atoms or a R$_f$—R$_k$—R$_2$-group, R$_f$ is a mixture of perfluoroalkyl groups, CF$_3$CF$_2$(CF$_2$)$_r$ in which r is 2 to 18; and q is 1, 2 or 3.

In a more particular embodiment, R$_f$ is a mixture of said perfluoroalkyl groups, CF$_3$CF$_2$(CF$_2$)$_r$; and r is 2, 4, 6, 8, 10, 12, 14, 16, and 18. In a preferred embodiment, r is predominantly 4, 6 and 8. In another preferred embodiment, r is predominately 6 and 8. The former preferred embodiment is more readily available commercially and is therefore less expensive, while the latter may provide improved properties.

Representative fluoroaliphatic alcohols that can be used for the purposes of this invention are:

$$C_sF_{(2s+1)}(CH_2)_t-OH, \quad (CF_3)_2CFO(CF_2CF_2)_uCH_2CH_2OH,$$

$$C_sF_{(2s+1)}CON(R_8)-(CH_2)_t-OH,$$

$$C_sF_{(2s+1)}SO_2N(R_8)-(CH_2)_t-OH, \text{ and}$$

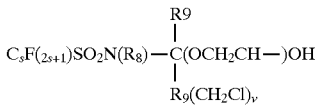

wherein s is 3 to 14; t is 1 to 12; u is 1 to 5; each of R$_8$ and R$_9$ is H or an alkyl group containing 1 to 6 carbon atoms.

In another embodiment, the fluorochemical compound can be represented by the formula:

$$H(CF_2CF_2)_wCH_2OH$$

wherein w is 1–10. The latter fluorochemical compound is prepared by reacting tetrafluoroethylene with methanol. Yet another such compound is 1,1,1,2,2,2-hexafluoroisopropanol having the formula:

$$CF_3(CF_3)CHOH.$$

Suitable fluorinated alcohols of the second reactant with the structure R$_f$CH$_2$CH$_2$OH wherein R$_f$ is a C$_2$–C$_{20}$ perfluorocarbon are exemplified by, but not limited to perfluoroalkyl ethanols available commercially as ZONYL BA and BA-N Fluorotelomer Intermediate from the E. I. du Pont de Nemours and Company, Wilmington Del. ZONYL BA and BA-N contain alpha-fluoro-omega-(2-hydroxyethyl)-poly(difluoromethylene) in the form of a mixture of the components of the homologous series of the formula $$F(CF_2CF_2)_n(CH_2CH_2)OH,$$

containing therein:

for n=2, BA contains 1%–2%, BA-N contains <1% for n=3, BA contains 27%–34%, BA-N contains 3%–8% for n=4, BA contains 29%–34%, BA-N contains 45%–50% for n=5, BA contains 17%–21%, BA-N contains 28%–33% for n=6, BA contains 6%–9%, BA-N contains 8%–13% for n=7, BA contains 2%–5%, BA-N contains 1%–6% for n=8, BA contains 1%–2%, BA-N contains 1%–6%

Suitable fluorinated thiols of of the structure R$_f$CH$_2$CH$_2$SH wherein R$_f$ is a C$_2$–C$_{20}$ perfluorocarbon of the second reactant are exemplified by LODYNE 924, commercially available from Ciba-Geigy, Ardsley N.Y. Suitable fluorinated sulfonamides of the structure R$_f$SO$_2$N(CH$_2$CH$_3$)CH$_2$CH$_2$OH wherein R$_f$ is a C$_2$ to C$_{20}$ perfluoro group are exemplified by FLUORAD FC-10 available from 3M Company, Minneapolis Minn.

In another embodiment, water-modified fluorochemical carbamates have been prepared by the sequential catalyzed reaction of DESMODUR N-100, DESMODUR N-3200, or DESMODUR N-3300, (hexamethylene diisocyanate homopolymers available from Bayer Corporation, Pittsburgh, Pa.) or mixtures thereof, with a stoichiometric deficiency of a perfluoroalkyl compound containing one functional group, then with a non-fluorinated reactant as described below, and then with water.

The third or nonfluorinated reactant used for preparing the polyfluoro compounds of the present invention and the polyurethane additives used in the coating of the present invention comprises a non-fluorinated organic compound which contains a single functional group. Usually between about 1% to about 60% of the isocyanate groups of the polyisocyanate are reacted with at least one such non-fluorinated compound. For example, said non-fluorinated compound can be represented by the formula:

$$(R_{10})-(R_2)_k-YH$$

wherein

R$_{10}$ is a C$_1$–C$_{18}$ alkyl group, a C$_1$–C$_{18}$ omega-alkenyl radical or a C$_1$–C$_{18}$ omega-alkenoyl;

R$_2$ is a divalent linear hydrocarbon radical, $-C_nH_{2n}-$ optionally encapped by

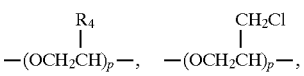

-continued

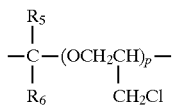

wherein $R_4$, $R_5$ and $R_6$ are the same or different and are H or an alkyl group of 1 to 6 carbon atoms;

n is 0 to 12, and is 1 to 50;

Y is O, S, or $N(R_7)$ in which $R_7$ is H or an alkyl group containing 1 to 6 carbon atoms; and k is 0 or 1.

For example, the non-fluorinated compound can be an alkanol or a monoalkyl or monoalkenyl ether or ester of a polyoxyalkylene glycol. Particular examples of such compounds include stearyl alcohol, the monomethyl ether of polyoxyethylene glycol, the mono-allyl or -methallyl ether of polyoxyethylene glycol, and the mono-methacrylic or acrylic acid ester of polyoxyethylene glycol.

In one embodiment the polyfluorourethane additives used in the coatings of the invention are prepared by reacting: (1) at least one diisocyanate, or polyisocyanate or mixture of polyisocyanates which contains at least three isocyanate groups per molecule with (2) at least one fluorochemical compound which contains per molecule (a) a single functional group having one or more Zerewitinoff hydrogen atoms and (b) at least two carbon atoms each of which contains at least two fluorine atoms, and (3) at least one non-fluorinated reactant as described above. Thereafter the remaining isocyanate groups can be optionally reacted with water to form one or more urea linkages or can be reacted completely with the previously described second and third reactants to form urea, carbamate, or thiocarbamate linkages.

Usually between about 40% and about 95% of the isocyanate groups will have been reacted before water is optionally reacted with the diisocyanate or polyisocyanate. In other words, the amount of water generally is sufficient to react with from about 5% to about 60% of the isocyanate groups in the diisocyanate or polyisocyanate. Preferably, between about 60% and 95% of the isocyanate groups have been reacted before water is optionally reacted with the diisocyanate or polyisocyanate, and most preferably between about 80% and 90% of the isocyanate groups have been reacted prior to reaction of water. Thus, in a preferred embodiment the amount of water is sufficient to react with about 5% to about 35% of the isocyanate groups, most preferably between 10% and 20%.

The preparation of the polyfluorourethane additive is exemplified by reacting, in the presence of a catalyst, an alkyl-terminated polyalkylene glycol, a fluoroalcohol or fluorothiol, and optionally an alcohol, thiol, or amine, with a diisocyanate or extended diisocyanate in a suitable solvent such as methylisobutylketone solution. Suitable catalysts are well known to those skilled in the art. For instance the catalyst is a metal organic exemplified by dibutyl tin dilaurate or tin octoate, or a tertiary amine, exemplified by trialkylamines, pyridine, ethyl morpholine, 1,4-diazabicyclo [2.2.2]octane (DABCO, Aldrich Chemical Co., Milwaukee Wis.) or 1,8-diazabicyclo[5.4.0]undec-7-ene (DBU, Aldrich Chemical Co., Milwaukee Wis.). The reaction product is optionally further reacted with water to give a polyurethane in methylisobutylketone. The polyurethane in methylisobutylketone is emulsified in water. In most cases emulsification occurs readily with mixing.

Emulsification is optionally facilitated by the use of homogenizing equipment and the use of anionic (e.g., alkyl sulfonates) or nonionic (e.g., alcohol ethoxylates or alkylphenol ethoxylates) surfactants chosen for compatibility with the water-dispersed coating composition. The methylisobutylketone solvent is removed under reduced pressure to leave an aqueous dispersion. This dispersion is then added to an existing water-dispersed coating composition and mixed thoroughly. The resulting modified water-dispersed coating composition is applied by standard means.

Suitable solvents for the reaction are exemplified by ketones such as methylisobutylketone, methyl amyl ketone, methyl ethyl ketone, esters such as ethyl acetate, and aromatic solvents such as toluene or xylene.

The water-modified fluorochemical carbamates are typically prepared by first charging the diisocyanate or polyisocyanate, the perfluoroalkyl compound, and a dry organic solvent such as methylisobutylketone to a reaction vessel. The order of reagent addition is not critical. The specific weight of aliphatic diisocyanate, polyisocyanate, and perfluoroalkyl compounds charged is based on their equivalent weights and on the working capacity of the reaction vessel and is adjusted so that all Zerewitinoff active hydrogens of the third reactant charged will react with some desired value between 40% and 100% of the total NCO group charge. The weight of dry solvent is typically 15%–30% of the total charge weight. The charge is agitated under nitrogen and heated to 40°–70° C. A catalyst, typically dibutyl tin dilaurate per se, or as a solution in methylisobutylketone, is added in an amount which depends on the charge, but is usually small, e.g., 1 to 2 parts per 10,000 parts of the diisocyanate or polyisocyanate. After the resultant exotherm, the mixture is agitated at a temperature between 65° and 105° C. for 0–20 hours from the time of the catalyst addition, and then, after its temperature is adjusted to between 55° and 90° C., is treated with water per se or with wet methylisobutylketone for an additional 1 to 20 hours. The resultant product is stored and/or used as prepared or after further solvent dilution, or converted by standard technology to an emulsion or dispersion. In some instances, the emulsion or dispersion is surfactant-stablized; in others, a stable emulsion or dispersion can be prepared without the use of a surfactant.

The emulsions of polyfluorourethane additives are formed by sequentially reacting isocyanate, fluorinated, and non-fluorinated reactants, further extending the reaction product by reaction with water, and finally preparing an aqueous emulsion by adding water, optionally emulsification aids, and removing residual organic solvents.

The polyfluorourethane additives in aqueous emulsion form can be readily incorporated into conventional water-dispersed coating compositions in concentrations sufficient to give a dried coating containing from about 100 to 20,000 $\mu$g/g of fluorine and preferably from about 500 to 2,000 $\mu$g/g of fluorine. For a typical latex paint containing from about 45% to 60% solids in the liquid paint, the polyfluorourethane additives of this invention are incorporated into coating compositions in an amount sufficient to give a coating composition containing about 50 to 10,000 $\mu$g/g of fluorine and preferably about 250 to 1,000 $\mu$g/g of fluorine. For other coatings such as wood stains, masonry coating, asphalt emulsions, and similar compositions, the polyfluorourethane additives of this invention are incorporated in an amount sufficient to give a coating composition containing from about 50 to about 10,000 $\mu$g/g of fluorine. The amount added is adjusted taking in to account the percent solids of the coating composition.

The units of weight of an aqueous emulsion of polyfluorourethane additives required to be added to each 100 units of weight of water-dispersed coating composition such that the resulting coating composition will dry to a film containing F μg/g fluorine is given by:

$$100FS/C(10^4 f\text{-}F)$$

wherein f is the percent fluorine in the polyfluorourethane additives, S is the percent solids (non-volatiles) in the original water-dispersed coating composition, and C is the percent concentration of polyfluorourethane additives in the added emulsion. The water-dispersed coating composition containing the polyfluorourethane additives is stirred to give a homogeneous mixture.

The addition of the dispersion of the polyfluorourethane additive is made to a preformulated coating composition at the point of sale or use, but is preferably made at the time of manufacture of the water-dispersed coating composition, when appropriate quality control procedures will be more readily available.

Application and drying properties of the water-dispersed coating compositions are essentially unaffected by the addition of the polyfluorourethane additives.

Alternatively, it is understood that the formulation of the coating composition can be modified when the polyfluorourethane additives are added. While the invention has been described with respect to certain specific embodiments, it will be appreciated that many modifications and changes can be made by those skilled in the art without departing from the invention.

The present invention comprises aqueous emulsions of polyfluorourethane additives for water-dispersed coating compositions that improve the oil repellency, soil resistance, and cleanability of the dried coating formed from such water-dispersed coating compositions when compared with control coatings without such an additive. A dried coating has improved oil repellency when the advancing and receding hexadecane contact angles on the dried coating containing the compound or additive, measured according to Test Method 1, are greater than the corresponding hexadecane contact angles on the control coating without the compound or additive. A dried coating has improved soil resistance when the mark produced by the crayon in the process described under "Preparation of the Soiled Sample" (Test Method 2—Paint Scrub Test) before scrubbing is visually less than the corresponding mark produced on the control coating without the polyfluorourethane additive. A dried coating has improved cleanability when the percent soil removed from the dried coating containing the compound or additive, after scrubbing according to Test Method 2 and evaluation according to Test Method 3, is greater than the corresponding percent soil removed for the control coating without the compound or additive. The crayon cleanability test gave cleanability results that correlated well with similar tests using other oily soils, including carbon black dispersed in mineral oil and a tomato sauce.

SAMPLE PREPARATION

The compound or additive is added at the weight percent indicated in the data table to the test water-dispersed coating composition and mixed thoroughly with a paint stick. The paint is applied to a Mylar sheet (termed a drawdown) at 6 mil (0.15 mm) wet thickness and 6 inches (15 cm) wide, or to a scrub panel Model P121-10N from Leneta Corporation, Mahwah N.J. at a 3 mil (0.076 mm) wet thickness, and allowed to dry for 7 days at room temperature and humidity (about 70° F. (21° C.) and 50% relative humidity). After drying, the water and hexadecane contact angle measurements are made as in Test Method 1, the paint film sample is soiled and scrubbed as described in Test Method 2, and the cleanability is evaluated as described in Test Method 3.

TEST METHOD 1—CONTACT ANGLE MEASUREMENT

Contact angles are measured by the Sessile Drop Method which is fully described in A. W. Adamson, "The Physical Chemistry of Surfaces", Fifth Edition, Wiley & Sons, New York N.Y., 1990, Chapter II, incorporated herein by reference. Additional information on the equipment and procedure needed to measure these contact angles is more fully described by R. H. Dettre and R. E. Johnson, Jr., in "Wettability", Ed. by J. C. Berg, Marcel Dekker, New York N.Y., 1993, Chapter 1, which is incorporated herein by reference.

A Ramè-Hart optical bench is used to hold the substrate in the horizontal position. The contact angle is measured with a telescoping goniometer from the same manufacturer. A drop of test liquid is placed on a surface and the tangent is precisely determined at the point of contact between the drop and the surface. An advancing angle is determined by increasing the size of the drop of liquid and a receding angle is determined by decreasing the size of the drop of liquid. The data are presented typically as advancing and receding contact angles. The hysteresis is the difference between the two angles.

The relationship between water and organic liquid contact angles and cleanability and dirt retention is described in chapters XII and XIII of A. W. Adamson, above. In general, the higher the contact angle the more dirt or soil resistant the surface is and the easier the surface is to clean.

TEST METHOD 2—PAINT SCRUB TEST

Preparation of the Soiled Sample

One inch (2.54 cm) is cut off each end of a 4 by 17 inch (10 by 43 cm) paint drawdown on a Leneta Scrub Test Panel, model number P121-10N (available from Leneta Company, Mahwah N.J.), that has cured for 7 days at ambient room conditions. Then 2 inch (5 cm) increments are marked and a blue crayon (Crayola Co., Easton Pa.) mark applied in the 2 inch (5 cm) area using the following procedure to standardize the application. A wax pencil is flattened somewhat by rubbing on a scrap piece of paper. The crayon is placed in a holder made from a 12 inch (30.5 cm) length of ½ inch (1.27 cm) stainless steel rod, bent at a 90 degree angle to provide an "L" shape with a 1 inch (2.54 cm) end. To the 1 inch (2.54 cm) section is attached a lab-frame connector to hold the crayon at a 45 degree angle to the surface. The bent rod is held at the opposite end to the crayon assembly, allowing the weight of the device to provide a uniform force on the crayon tip. The crayon tip is rubbed back and forth 50 times to make a uniform mark on the paint. Typically this holder will put 100 g of force (0.98N) on the surface. The items are cut out and tested on a scrub machine. The rod and connector are available from VWR Co. (South Plainfield N.J.) as Catalog # 60079-533 and 60097-055 respectively.

Preparation of the Scrub Machine

Make up a aqueous 1% TIDE detergent (Proctor and Gamble Co., Cincinnati Ohio) solution to use for cleaning experiments. Using a 1 lb (0.45 kg) Gardner Abrasion boat (WA-2151, Paul N. Gardner Co., Pompano Beach Fla.), a 9 in (22.9 cm) wide skein of double cheesecloth (Grade 20B, Deroyal Textiles, Camden S.C.) is folded three times to make a 2.5 inch (6.3 cm) wide pad. it is tightly attached to the abrasion boat and 20 ml of the TIDE solution is applied. The boat is placed in the scrub machine (Gardner DV-10, Paul N. Gardner Co., Pompano Beach Fla.) and the example is scrubbed for the number of scrub strokes indicated in the data table. A fresh piece of cheesecloth is used for each test. The test item is taped using transparent adhesive tape (e.g., SCOTCH MAGIC TAPE from 3M Commercial Office Supply Division, St. Paul Minn.), in the middle of the scrub table so that approximately ½ the marked surface will be cleaned by the machine. The table should be dry before taping. After scrubbing, the item is removed, water rinsed and air dried. The amount removed is rated visually or by using a reflectance meter as described in Test Method 3, in comparison to the unscrubbed side.

TEST METHOD 3—EVALUATION OF SCRUBBED SOILED SAMPLES

A rating of −1 indicates the mark is smeared and darker. A rating of 0 indicates no change. Ratings of 1 to 10 indicate 10% to 100% respectively of the soil has been removed.

The numerical evaluation shown in Table 1 is used:

TABLE 1

Evaluation Criteria for Soil Resistance and Cleanability

| Rating (#) | Amount Removed (%) |
|---|---|
| −1 | 0 |
| 0 | 0 |
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 95+ |

For a more quantitative evaluation of the scrubbed panel, after the requisite number of cycles, the panel is removed, rinsed under tap water, and air dried. A cleanability scale is created by measuring the reflectance, using a reflectance meter, of a soiled unwashed area, and assigning it a cleanability rating of zero. The reflectance of an unsoiled area is measured and assigned a cleanability rating of 10. The interval between these reflectance values is divided into ten equal intervals to create the cleanability rating scale. The Munsell neutral value scale is used to help assign cleanability ratings if a reflectance meter is not available. If the reflectance is measured, a scale can be constructed as shown below for a paint that exhibits a maximum measured reflectance for the unsoiled area of 80% and the minimum measured reflectance for the soiled area of 20%.

TABLE 2

Cleanability Rating Scale

| Cleanability Rating | % Reflectance |
|---|---|
| 10 | 80 (Maximum) |
| 9 | 74 |
| 8 | 68 |
| 7 | 62 |
| 6 | 56 |
| 5 | 50 |
| 4 | 44 |
| 3 | 38 |
| 2 | 32 |
| 1 | 26 |
| 0 | 20 (Minimum) |

A dried coating is deemed to have improved soil resistance when the intensity of the color on the dried coating containing the polyfluorourethane additive, after soiling as in Test Method 2 and before scrubbing, is less than the corresponding intensity of color on the control coating without the compound or additive. The test is always run with a control (untreated paint) to compare the soil resistance of paint with and without the compound or polyfluorourethane additive.

A dried coating is deemed to have improved cleanability when the Rating Number for the dried coating containing the polyfluorourethane additive, after scrubbing according to Test Method 2 and evaluation according to Test Method 3, is greater than the corresponding Rating Number for the control coating without the polyfluorourethane additive. The test is always run with a control (untreated paint) to compare cleanability of paint with and without the polyfluorourethane additive.

TEST METHOD 4—SWELLING OF WOOD SUBSTRATES

The swelling of wood substrates due to the application of water-dispersed coating compositions was measured using the Swellometer instrument and method described in ASTM-D-446.

The polyurethane compounds of the present invention are useful as additives for water-dispersed coating compositions to reduce swelling of wood substrates upon application of water-dispersed coating compositions, and to provide soil resistance, oil repellency and improved cleanability to the dried coating. The coating compositions of the present invention containing such additives and the dried coatings of the present invention formed therefrom are useful for coating various substrates such as walls, furniture, wood, masonry, cement, asphalt and other surfaces to which conventional paints, sealers, stains, finishes and emulsions are applied. The coating compositions are particularly useful on surfaces where soil resistance and ease of cleaning are desired.

EXAMPLES

Example 1

Preparation of Polyfluorourethane Additive with MPEG-350

Into a 1000 ml round bottom flask fitted with a mechanical stirrer, condenser, and nitrogen inlet, and heated with a controlled heating mantel is placed 256 g of N-163D (a 60% methylisobutylketone solution of DESMODUR N-100, from Bayer Corporation, Pittsburgh Pa.), 42 g of ZONYL BA Fluorotelomer Intermediate (from E. I. du Pont de Nemours and Company, Wilmington Del.), and 235 g MPEG-350 (from Union Carbide Company, Danbury Conn.). The contents were heated to 55° C. A 20 g solution of methylisobutylketone containing 0.040 g dibutyl tin dilaurate was added and the exothermic reaction raised the temperature to 90° C. over a 20 minute period after which time heat was applied to maintain the pot temperature at 90° C. for an additional 3 hours.

After the 3 hour hold, the organic reaction mass was added over a half hour period to a different 2 liter stirred (150 rpm) flask containing 40 g water and 100 g methylisobutylketone, and held at 75° C. for 2 hours after the addition was complete. The agitator was turned off and 600 g of water at 75° C. added over a 30 minute period. The mixture was stirred for 1 hour after which a distillation head, condenser, and vacuum take-off were attached and a vacuum applied to remove the methylisobutylketone/water azeotrope at a temperature of about 55° C. and 13 KPa pressure. The flask was allowed to cool to 50° C. and then maintained at that temperature at 13 KPa until the pot material has a flash point above 93° C. (200° F.). The distillation pot contained 914 g of solution having 44.5% solids.

This solution was diluted to 33% solids with water and added to the water-dispersed coating composition in an amount to yield the desired weight percent additive in the treated coating, as indicated in Table 4, typically 2% and 5%. The coating composition was thoroughly mixed by stirring. Drawdown samples were prepared, soiled, scrubbed, and evaluated by Test Methods 2 and 3 with the results shown in Table 4. Contact angles were measured according to Test Method 1, the results are shown in Table 3.

TABLE 3

Contact Angle Measurements for Example 1

| Sample | Contact Angle | | | |
|---|---|---|---|---|
| | Water | | Hexadecane | |
| | Advancing | Receding | Advancing | Receding |
| Control coating without polyfluorourethane additive | 78 | 0 | 0 | 0 |
| Coating containing polyfluorourethane additive of Example 1 | 16 | 0 | 74 | 46 |

TABLE 4

Cleanability and Soil Repellency Measurements
Drawdowns were prepared using commercially available coating compositions prepared with the 33% solids solution of the polyfluorourethane additive prepared as in Example 1. The commercial paints are designated by the letters A to V.

| | A | | | B | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | | 0 | 0 | 0 |
| 25 | 0 | 0 | 9 | 5 | 10 | 10 |
| 50 | 2 | 1 | 10 | 8 | 10 | 10 |
| 100 | 4 | 5 | 10 | 9 | 10 | 10 |
| 200 | 7 | 7 | 10 | 10 | 10 | 10 |

| | C | | | D | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 3 | 7 | 9 | 7 | 8 | 10 |
| 50 | 5 | 9 | 10 | 9 | 10 | 10 |
| 100 | 7 | 10 | 10 | 10 | 10 | 10 |
| 200 | 8 | 10 | 10 | 10 | 10 | 10 |

| | E | | | F | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 5 | 7 | 10 | 3 | 6 | 9 |
| 50 | 8 | 9 | 10 | 5 | 9 | 10 |
| 100 | 10 | 10 | 10 | 8 | 10 | 10 |
| 200 | 10 | 10 | 10 | 10 | 10 | 10 |

| | G | | | H | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 3 | 5 | 8 | 5 | 9 | 8 |
| 50 | 7 | 9 | 10 | 9 | 10 | 10 |
| 100 | 10 | 10 | 10 | 10 | 10 | 10 |
| 200 | 10 | 10 | 10 | 10 | 10 | 10 |

TABLE 4-continued

Cleanability and Soil Repellency Measurements
Drawdowns were prepared using commercially available coating
compositions prepared with the 33% solids solution of the polyfluorour-
ethane additive prepared as in Example 1. The commercial paints are
designated by the letters A to V.

| | I | | | J | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 1 | 5 | 7 | 2 | 8 | 9 |
| 50 | 3 | 9 | 8 | 5 | 9 | 10 |
| 100 | 7 | 10 | 10 | 9 | 10 | 10 |
| 200 | 9 | 10 | 10 | 10 | 10 | 10 |

| | K | | | L | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 2 | 2 | 9 | 0 | 1 | 9 |
| 50 | 4 | 6 | 10 | 1 | 5 | 10 |
| 100 | 7 | 8 | 10 | 3 | 9 | 10 |
| 200 | 8 | 10 | 10 | 9 | 10 | 10 |

| | M | | | N | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 2 | 4 | 10 | 1 | 2 | 7 |
| 50 | 9 | 9 | 10 | 5 | 7 | 9 |
| 100 | 10 | 10 | 10 | 8 | 9 | 10 |
| 200 | 10 | 10 | 10 | 9 | 10 | 10 |

| | O | | | P | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 2 | 9 | 9 | 8 | 8 | 9 |
| 50 | 7 | 10 | 10 | 9 | 9 | 9 |
| 100 | 9 | 10 | 10 | 10 | 10 | 10 |
| 200 | 10 | 10 | 10 | 10 | 10 | 10 |

| | Q | | | R | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 0 | 1 | 8 | 9 | 10 | 10 |
| 50 | 3 | 3 | 9 | 10 | 10 | 10 |
| 100 | 5 | 7 | 10 | 10 | 10 | 10 |
| 200 | 7 | 9 | 10 | 10 | 10 | 10 |

| | S | | | T | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 8 | 8 | 8 | 6 | 6 | 9 |
| 50 | 9 | 9 | 9 | 9 | 9 | 10 |
| 100 | 10 | 10 | 10 | 10 | 10 | 10 |
| 200 | 10 | 10 | 10 | 10 | 10 | 10 |

TABLE 4-continued

Cleanability and Soil Repellency Measurements
Drawdowns were prepared using commercially available coating
compositions prepared with the 33% solids solution of the polyfluorour-
ethane additive prepared as in Example 1. The commercial paints are
designated by the letters A to V.

|  | U | | | V | | |
|---|---|---|---|---|---|---|
| Scrub Cycles | As Purchased | 2% Additive | 5% Additive | As Purchased | 2% Additive | 5% Additive |
| 0 (as soiled) | 0 | 0 | 0 | 0 | 0 | 0 |
| 25 | 2 | 1 | 7 | 2 | 8 | 8 |
| 50 | 6 | 8 | 9 | 7 | 9 | 10 |
| 100 | 9 | 10 | 10 | 9 | 10 | 10 |
| 200 | 10 | 10 | 10 | 10 | 10 | 10 |

Example 2
Preparation of Polyfluorourethane Additive with MPEG-750

Into a 1000 ml round bottom flask fitted with a mechanical stirrer, condenser, and nitrogen inlet, and heated with a controlled heating mantel was placed 65 g of A-147 (a 60% methylisobutylketone solution of DESMODUR N-100, from Bayer Corporation, Pittsburgh Pa.) and 200 g methylisobutylketone. The flask was heated to raise the temperature of the contents to 80° C., when 10 g of ZONYL BA Fluorotelomer Intermediate (from E. I. du Pont de Nemours and Company, Wilmington Del.), 120 g of polyethylene glycol monomethyl ether having an average molecular weight of 750, MPEG-750, available from Union Carbide, Danbury Conn., and 0.05 g dibutyl tin dilaurate were added. The contents were stirred for 2 hours at 80° C. Then 1 g of water was added and heating continued for an additional 2 hours. The organic solution was then added to 400 g of water and blended in a Silverson mixer for 30 seconds. The resultant emulsion was solvent-stripped at about 50° C. and 13 KPa pressure to leave 412 g of a clear fluid dispersion. Six weight per cent of this solution was added to a formulated white latex paint (Rohm & Haas, Philadelphia Pa.) to give 1000 μg/g fluorine in the amended latex paint. A 5 mil film of paint applied to MYLAR film (polyester film, E. I. du Pont de Nemours and Company, Wilmington Del.) and air-dried at ambient conditions for 24 hours. The dried film contained about 2,000 μg/g fluorine.

Example 3
Preparation of Polyfluorourethane Additive with MPEG-350 at Equal Mole Ratio of Fluorochemical Alcohol to Polyethylene Glycol Monomethyl Ether Into a 1000 ml round bottom flask fitted with a mechanical stirrer, condenser, and nitrogen inlet, and heated with a controlled heating mantle was placed 256 g of a 60% methylisobutylketone solution of DESMODUR N-100 (from Bayer Corporation, Pittsburgh Pa.), 180 g of ZONYL BA Fluorotelomer Intermediate (from E. I. du Pont de Nemours and Company, Wilmington Del.), and 126 g of polyethylene glycol monomethyl ether having an average molecular weight of 350, MPEG-350 from Union Carbide, Danbury Conn. The contents were heated to 55° C. A 20 g solution of methylisobutylketone containing 0.040 g dibutyl tin dilaurate was added and the exothermic reaction raised the temperature to 90° C., which temperature was maintained for an additional 3 hours. After the 3-hour hold, 8 g water were added and the contents stirred for an additional hour.

The contents were then added with stirring over a 10 minute period to a 2 liter flask containing 900 g of water and 100 g of methylisobutylketone at 75° C. This flask was fitted with a distillation head, condenser, and vacuum take-off adapter and receiver. The mixture was stirred for 15 minutes and a vacuum applied to remove the methylisobutylketone/water azeotrope at a temperature of about 55° C. and 13 KPa pressure. The flask was allowed to cool to 50° C. and then maintained at that temperature at 13 KPa until the pot material had a flash point above 93° C. (200° F.). The distillation pot contained 914 g of solution having 44.5% solids. This solution was diluted to 33% solids with water, added to paints at 1% by weight, and evaluated as described previously.

Example 4
Preparation of Polyfluorourethane Additive with Perfluorooctyl Ethyl Thiol (Lodyne 924) and MPEG-350.

The preparation was made as for Example 3 except that the reactants were 130 g of a 60% methylisobutylketone solution of DESMODUR N-100 (from Bayer Corporation, Pittsburgh, Pa.), 53 g (0.10 mole) of 3,3,4,4,5,5,6,6,7,7,8,8,9,9,10,10,10-heptadecafluoro-1-decanethiol, LODYNE 924 (from Ciba Corp. Ardsley N.Y.), and 91 g polyethylene glycol monomethyl ether having an average molecular weight of 350, MPEG-350 from Union Carbide, Danbury, Conn. After the flash point had been raised above 93° C. (200° F.), the distillation pot contained 734 g of solution having 34.2% solids. The solution was diluted to 33% solids with water, added to paints at 1% by weight, and evaluated as described previously.

Example 5
Preparation of Polyfluorourethane Additive with N-Ethyl-N-(2-hydroxyethyl)perfluorooctanesulfonamide (FC-10) and MPEG-350

The preparation was made as in Example 3 except that the reactants were 130 g of a 60% methylisobutylketone solution of DESMODUR N-100 (from Bayer Corporation, Pittsburgh Pa.), 54 g (0.10 mole) of N-ethyl-1,1,2,2,3,3,4,4,5,5,6,6,7,7,8,8,8-heptadecafluoro-N-(2-hydroxyethyl)-1-octanesulfonamide, FC-10 (3M Corporation, Minneapolis Minn.), and 91 g polyethylene glycol monomethyl ether having an average molecular weight of 350, MPEG-350 (from Union Carbide, Danbury Conn.). After the flash point had been raised above 93° C. (200° F.), the distillation pot contained 568 g of solution having 37.3% solids. The solution was diluted to 33% solids with water, added to paints at 1% by weight, and evaluated as described previously.

Example 6

Preparation of Polyfluorourethane Additive with Perfluoroalkyl Ethyl Ethoxylate and MPEG-350

The preparation was made as in Example 3 except that the reactants were 130 g of a 60% methylisobutylketone solution of DESMODUR N-100 (from Bayer Corporation, Pittsburgh Pa.), 75 g (0.10 mole) of ZONYL FSO-100 a fluorotelomer monoether with polyethylene glycol CAS No. 122525-99-9 (from E. I. du Pont de Nemours and Company, Wilmington Del.), and 91 g MPEG-350 (from Union Carbide, Danbury Conn.). After the flash point had been raised to above 93° C. (200° F.), the distillation pot contained 622 g of solution having 36.1% solids. The solution was diluted to 33% solids with water, added to paints at 1% by weight and evaluated as described previously.

Example 7

Evaluation of Perfluoraklyl Polyurethanes as Latex Cleanability Agents

The perfluoroalkyl polyurethanes of Examples 3–6 were evaluated as cleanability agents by adding 1 wt. percent of the afore described material into a commercial flat latex paint. The paint was drawn down as described previously and the films allowed to cure for 7 days at ambient temperature. The cleanability of the films was evaluated as described in Test Method 2 and 3. The following results were obtained for blue crayon.

TABLE 5

Evaluation of Various Perfluoroalkyl Polyurethanes as Cleanability Agents

| Number of Scrub Cycles | 25 | 50 | 100 |
|---|---|---|---|
| | Cleanability Rating | | |
| Example 3 | 2 | 8 | 8 |
| Example 4 | 4 | 8 | 9 |
| Example 5 | 2 | 8 | 10 |
| Example 6 | 2 | 7 | 9 |
| None | 2 | 3 | 9 |

Example 8

Evaluation of Polyfluorourethane Additive as an Anti-swelling Agent for Wood

A 10 g sample of the material described in Example 3 was diluted to 200 g with water. A piece of wood was treated as described Test Method 4, (ASTM D-4446-84) and air dried for 7 days at ambient conditions. It was then placed into a wood swellometer and tested by the ASTM procedure. The treated wood swelled 35% and 46% less than untreated control.

Example 9

Evaluation of Polyfluorourethane Additive as an Oil Repellent on Hard Surfaces

The material described in Example 3 was diluted to 5% solids with water and applied with a paint brush to the surfaces indicated below. The oil and water contact angles were measured and are summarized in the table below.

TABLE 6

Oil and Water Repellency on Hard Surfaces

| | Water Contact Angle | | Hexadecane Contact Angle | |
|---|---|---|---|---|
| | Advancing | Receding | Advancing | Receding |
| Concrete control | * | * | * | * |
| Concrete Treated | * | * | 127 | 34 |
| Brick Control | * | * | * | * |
| Brick Treated | 63 | 0 | 111 | 38 |
| Terra Cotta Control | * | * | * | * |
| Terra Cotta Treated | 86 | 0 | 128 | 0 |
| Slate Control | 0 | 0 | * | * |
| Slate Treated | 62 | 0 | 95 | 43 |
| Granite Control | 51 | 16 | 12 | 0 |
| Granite Treated | 42 | 0 | 80 | 56 |
| Marble Control | 52 | 0 | 12 | 0 |
| Marble Treated | 46 | 0 | 84 | 55 |
| Wood Control | * | * | * | * |
| Wood Treated | 133 | 0 | 137 | 0 |
| Limestone Control | * | * | * | * |
| Limestone Treated | ** | ** | ** | ** |

*Liquid was absorbed into the surface
**Surface too rough to measure angles

Example 10

Evaluation of Polyfluorourethane Additive as an Oil Repellent for Asphalt

The material described in Example 3 was diluted to 5% solids with with water. A piece of asphalt was painted with this solution and allowed to dry overnight. Drops of hexadecane and water were placed on the surface and found to bead versus untreated control.

I claim:

1. A polyfluorourethane compound which is the product of the reaction of: (1) at least one diisocyanate, (2) at least one fluorochemical compound containing at least one Zerewitinoff hydrogen in an amount sufficient to react with 5% to 80% of the isocyanate groups in the diisocyanate, (3) at least one compound of formula $R_{10}$—$(R_2)_k$—YH in an amount sufficient to react with 5% to 80% of the isocyanate groups in the diisocyanate wherein $R_{10}$ is a $C_1$–$C_{18}$ alkyl, $C_2$–$C_{18}$ omega-alkenyl radical, $C_2$–$C_{18}$ omega-alkenoyl; $R_2$ is —$C_nH_{2n}$— optionally end-capped with —[$OCH_2C(R_4)$ H]$_p$—, —[$OCH_2C(CH_2Cl)H$]$_p$—, or —$C(R_5)(R_6)(OCH_2C$ [$CH_2Cl$]H)$_p$— wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the diisocyanate.

2. A polyfluorourethane compound which is the product of the reaction of: (1) at least one polyisocyanate or a mixture of polyisocyanates containing at least three isocyanate groups per molecule, (2) at least one fluorochemical compound containing at least one Zerewitinoff hydrogen in an amount sufficient to react with 5% to 33% of the isocyanate groups in the polyisocyanate, (3) at least one compound of the formula $R_{10}$—$(R_2)_k$—YH in an amount sufficient to react with 5% to 80% of the isocyanate groups in the polyisocyanate and wherein $R_{10}$ is a $C_1$–$C_{18}$ alkyl, $C_2$–$C_{18}$ omega-alkenyl radical, or $C_2$–$C_{18}$ omega-alkenoyl; $R_2$ is —$C_nH_2n$— optionally end-capped by —[$OCH_2C(R_4)$ H]$_p$—[$OCH_2C(CH_2Cl)H$]$_p$—, or —$C(R_5)(R_6)(OCH_2C$ [$CH_2Cl$]H)$_p$—, wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the polyisocyanate.

3. An improved water-dispersed coating composition comprising an emulsion, latex, or suspension of a film-forming material dispersed in an aqueous medium wherein the improvement comprises the incorporation into the aqueous medium of a polyfluorourethane compound which is the product of the reaction of: (1) at least one diisocyanate, or polyisocyanate or mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_2$–$C_{18}$ omega-alkenyl radical, or $C_2$–$C_{18}$ omega-alkenoyl; $R_2$ is —$C_nH_2n$— optionally end-capped with; —[$OCH_2C(R_4)H$]$_p$—, —[$OCH_2C(CH_2Cl)H$]$_p$—, or —$C(R_5)(R_6)(OCH_2C[CH_2Cl]H)_p$— wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the diisocyanate or polyisocyanate.

4. The composition of claim 3 wherein the film-forming material is selected from the group consisting of a latex polymer of acrylate, acrylic, vinyl-acrylic, vinyl, or a mixture thereof.

5. The composition of claim 3 wherein the fluorochemical compound is perfluoroalkyl in an amount sufficient to react with at least 40% of the isocyanate groups and wherein the compound of formula $R_{10}(R_2)_k$—YH is polyethylene glycol methyl ether in an amount sufficient to react with at least 30% of the isocyanate groups.

6. A dried coating comprising the composition of claim 3.

7. A method for improving the cleanability of a surface having deposited thereon a dry coating composition comprising addition to the coating composition prior to drying of a polyurethane compound which is the product of the reaction of: (1) at least one diisocyanate, or polyisocyanate or a mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of the formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_2$–$C_{18}$ omega-alkenyl radical, or $C_2$–$C_{18}$ omega-alkenoyl; $R_2$ is —$C_nH_2n$— optionally endcapped with —[$OCH_2C(R_4)H$]$_p$—, [$OCH_2C(CH_2Cl)H$]$_p$—, or —$C(R_5)(R_6)(OCH_2C[CH_2Cl]H)_p$—, wherein $R_4$, $R_5$, and $R_6$ are the same or different and are H or a $C_1$–$C_6$ alkyl radical n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the diisocyanate or polyisocyanate.

8. A method for improving the oil repellency of a surface having deposited thereon a dry coating composition comprising addition to the coating composition prior to drying of a polyurethane compound which is the product of the reaction of: (1) at least one diisocyanate, or polyisocyanate or a mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of the formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_2$–$C_{18}$ omega-alkenyl radical, or $C_2$–$C_{18}$ omega-alkenoyl; $R_2$ is —$C_nH_2n$— optionally end-capped with —[$OCH_2C(R_4)H$]$_p$—, —[$OCH_2C(CH_2Cl)H$]p—, or —$C(R_5)(R_6)(OCH_2C[CH_2Cl]H)_p$—, wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0; or 1; and optionally (4) water in an amount sufficient to react with 5% to 60% of the isocyanate groups in the diisocyanate or polyisocyanate.

9. A method for reducing swelling in wood upon application of a water-dispersed coating composition comprising addition to the coating composition prior to application of a polyurethane compound which is the product of the reation of 1) at least one diisocyanate, or polyisocyanate or a mixture of polyisocyanates containing at least three isocyanate groups per molecule, (2) at least one fluorochemical compound containing at least one Zerewitinoff hydrogen in an amount sufficient to react with 5% to 80% of the isocyanate groups in the diisocyanate or polyisocyanate, (3) at least one compound of the formula $R_{10}$—$(R_2)_k$—YH in an amount sufficient to react with 5% to 80% of the isocyanate groups in the diisocyanate or polyisocyanate and wherein $R_{10}$ is a $C_1$–$C_{18}$ alkyl, $C_2$–$C_{18}$ omega-alkenyl radical, or $C_2$–$C_{18}$ omega-alkenoyl; $R_2$ is —$C_nH_2n$— optionally end-capped with —[$OCH_2C(R_4)H$]$_p$—, —[$OCH_2C(CH_2Cl)H$]p—, or —$C(R_5)(R_6)(OCH_2C[CH_2Cl]H)_p$—, wherein $R_4$, $R_5$, and $R_6$ are the same or different and are H or a $C_1$–$C_6$ alkyl radical, n is 0 to 12, p is 1 to 50; Y is O, S, or $N(R_7)$ wherein $R_7$ is H or $C_1$–$C_6$ alkyl; and k is 0 or 1; and optionally (4) water in an amount sufficient to react with 5% to 60% of the isocyanate groups in the diisocyanate or polyisocyanate.

* * * * *